(12) United States Patent
Yun et al.

(10) Patent No.: US 7,215,398 B2
(45) Date of Patent: May 8, 2007

(54) LIQUID CRYSTAL DISPLAY DEVICE HAVING AN AUXILIARY ELECTRODE CORRESPONDING TO THE PERIPHERY OF THE PIXEL ELECTRODE IN ONLY ONE OF AT LEAST TWO DOMAIN

(75) Inventors: Sai Chang Yun, Taegu-Kwangyokshi (KR); Do Sung Kim, Kumi-shi (KR)

(73) Assignee: L.G. Philips LCD Co., Ltd, Youngdungapo-ku, Seoul (KR)

( * ) Notice: Subject to any disclaimer, the term of this patent is extended or adjusted under 35 U.S.C. 154(b) by 38 days.

(21) Appl. No.: 10/405,326

(22) Filed: Apr. 3, 2003

(65) Prior Publication Data
US 2004/0008312 A1    Jan. 15, 2004

(30) Foreign Application Priority Data
Jul. 12, 2002    (KR) ............... 10-2002-0040777

(51) Int. Cl.
*G02F 1/1343*    (2006.01)
(52) U.S. Cl. ............... 349/139; 349/129; 349/123
(58) Field of Classification Search ............... 349/143, 349/141, 43, 123, 38, 139, 147, 126, 129 349/106, 110
See application file for complete search history.

(56) References Cited

U.S. PATENT DOCUMENTS

| | | | |
|---|---|---|---|
| 4,691,995 A | 9/1987 | Yamazaki et al. | |
| 5,309,264 A | 5/1994 | Lien et al. | |
| 5,608,556 A * | 3/1997 | Koma | 349/143 |
| 5,666,179 A | 9/1997 | Koma | |
| 5,953,093 A * | 9/1999 | Hirata et al. | 349/143 |
| 6,356,335 B1 * | 3/2002 | Kim et al. | 349/156 |
| 6,654,090 B1 * | 11/2003 | Kim et al. | 349/129 |

(Continued)

FOREIGN PATENT DOCUMENTS

EP    0 884 626 A2    12/1998

(Continued)

OTHER PUBLICATIONS

Y. Tanaka et al.; Late-News Paper: A New Design to Improve Performance and Simplify the Manufacturing Process of High-Quality MVA TFT-LCD Panels; Fujitsu Ltd., Tottori, Japan; SID 99 DIGEST; pp. 206-209.

(Continued)

*Primary Examiner*—Dung T. Nguyen
*Assistant Examiner*—Thoi V. Duong
(74) *Attorney, Agent, or Firm*—McKenna Long & Aldridge LLP

(57) ABSTRACT

A liquid crystal display (LCD) device is disclosed, which obtains a high aperture ratio and a wide viewing angle. The LCD device includes first and second substrates; a plurality of gate and data lines on the first substrate to define a plurality of pixel regions; a pixel electrode in each pixel region; a common electrode on the second substrate, the common electrode having an electric field inducing window dividing each pixel region into at least two domains; an auxiliary electrode on the first substrate, the auxiliary electrode corresponding to the periphery of the pixel electrode in one of at least two domains; and a liquid crystal layer between the first and second substrates.

4 Claims, 7 Drawing Sheets

U.S. PATENT DOCUMENTS 6,770,910 B2 * 8/2004 Yu et al. .................. 257/72
6,809,787 B1 * 10/2004 Seo et al. .................. 349/129

FOREIGN PATENT DOCUMENTS

| JP | 6-235925 | 8/1994 |
| JP | 8-101395 | 4/1996 |
| JP | 9-61829 | 3/1997 |
| JP | 10-177178 | 6/1998 |
| JP | 10-333157 | 12/1998 |
| JP | 10-333159 | 12/1998 |
| JP | 11-133438 | 5/1999 |
| JP | 11-142864 | 5/1999 |
| JP | 11-248930 | 9/1999 |
| JP | 11-326922 | 11/1999 |
| KR | 10-2000-0033121 | 6/2000 |
| KR | 10-2000-0035709 | 6/2000 |
| WO | WO 00/08521 | 2/2000 |

OTHER PUBLICATIONS

Communication from Korean Patent Office dated Jul. 18, 2006.

* cited by examiner

LIQUID CRYSTAL DISPLAY DEVICE HAVING AN AUXILIARY ELECTRODE CORRESPONDING TO THE PERIPHERY OF THE PIXEL ELECTRODE IN ONLY ONE OF AT LEAST TWO DOMAIN

This application claims the benefit of the Korean Application No. P2002-40777 filed on Jul. 12, 2002, which is hereby incorporated by reference for all purposes as if fully set forth herein.

BACKGROUND OF THE INVENTION

1. Field of the Invention

The present invention relates to a liquid crystal display (LCD) device, and more particularly, to a liquid crystal display (LCD) device for obtaining high aperture ratio and wide viewing angle.

2. Discussion of the Related Art

In general, a liquid crystal display (LCD) device includes lower and upper substrates facing each other with a predetermined interval therebetween, and a liquid crystal layer between the lower and upper substrates. The liquid crystal layer is driven by an electric field generated between the lower and upper substrates, thereby displaying an image.

Among the LCD devices, a Twisted Nematic (TN) mode liquid crystal display (LCD) device has been most generally used. In TN mode, longitudinal directions of liquid crystal molecules between the lower and upper substrates are parallel with the lower and upper substrates, and the liquid crystal molecules are spirally twisted with a predetermined pitch, so that the longitudinal directions of the liquid crystal molecules are aligned to change continuously.

The TN mode LCD device has characteristics of varying the transmittance of light at each gray level in accordance with a corresponding viewing angle. Specifically, the transmittance of light is distributed symmetrically in right and left directions of the TN mode LCD device, but asymmetrically in lower and upper directions, whereby gray inversion is generated. In order to overcome such a problem, a method is proposed to compensate for the variation of light transmittance in accordance with a corresponding viewing angle by providing domains with differentiating an alignment directions of a liquid crystal layer in a pixel region.

An example of a multi-domain technology dividing a pixel region into a plurality of domains is Two Domain Twisted Nematic (TDTN) mode, in which one pixel region is divided into two domains by a boundary at the center portion of the pixel region, and liquid crystal molecules are symmetrically aligned in the two domains in accordance with the boundary. The TDTN mode has a problem in that manufacturing process steps are complicated due to repetitive photolithography process steps. In this respect, a method for forming an auxiliary electrode and an electric field inducing window is applied to the TDTN mode, which has been usually applied to a vertical alignment (VA) mode LCD device. Herein, the method for forming the auxiliary electrode and the electric field inducing window is applied to a TN mode LCD device.

A related art LCD device will be explained with reference to the accompanying drawings. FIG. 1A is a plan view illustrating a related art LCD device, and FIG. 1B is a cross-sectional view illustrating a related art LCD device taken along line I–I' of FIG. 1A when voltage is applied.

Referring to FIG. 1A and FIG. 1B, the related art LCD device includes lower and upper substrates 10 and 20 facing each other, and liquid crystal molecules 31 between the lower and upper substrates 10 and 20. A plurality of gate and data lines 11 and 12 are formed on the lower substrate 10 and each other to define a plurality of pixel regions. A pixel electrode 15 is formed in each pixel region. An auxiliary electrode 13 is formed on the same layer as the data line 12, and the auxiliary electrode 13 is formed at the periphery of the pixel electrode 15. Then, a gate insulating layer (not shown) is formed between the gate and data lines 11 and 12, and a passivation layer 14 is formed between the data line 12 and the pixel electrode 15. Although not shown, a thin film transistor including a gate electrode, a semiconductor layer, and source/drain electrodes is formed at each crossing point of the gate and data lines 11 and 12.

An upper substrate 20 includes a black matrix layer 21 that prevents light from leaking in regions other than the pixel region, a color filter layer 22 for displaying red (R), green (G), and blue (B) colors, an overcoat layer 23 for planarizing the upper substrate 20, and a common electrode 24 on the overcoat layer 23. At this time, an electric field inducing window 25 is formed in the common electrode 24 for differentiating the alignment direction of the liquid crystal molecules.

A fringe field is formed by the electric field inducing window 25 inside the common electrode 24. The liquid crystal molecules at both sides of the common electrode 24 are differently aligned in accordance with the fringe field. At this time, the auxiliary electrode 13 reinforces the fringe field in the periphery of the pixel electrode 15. Also, a liquid crystal layer of the liquid crystal molecules 31 is formed between the lower and upper substrates 10 and 20.

At this time, first and second alignment layers 16 and 26 are respectively formed on entire surfaces of the lower and upper substrates 10 and 20 for an initial alignment of the liquid crystal molecules 31. The first alignment layer 16 of the lower substrate 10 is deflected from the second alignment layer 26 of the upper substrate 20, whereby the liquid crystal molecules 31 adjacent to the first and second alignment layer 16 and 26 are aligned in accordance with the alignment direction of the respective first and second alignment layers.

An operation of the related art LCD device having the aforementioned structure will be explained as follows.

When a voltage is not applied, the longitudinal directions of the liquid crystal molecules are parallel with the lower and upper substrates 10 and 20, and the liquid crystal molecules are continuously twisted at 90 degrees. Thus, light moves along the longitudinal directions of the twisted liquid crystal molecules, whereby a screen becomes white. When a voltage is applied, as shown in FIG. 1B, the longitudinal directions of the liquid crystal molecules would be perpendicular to the lower and upper substrates 10 and 20, whereby a screen becomes black, except for the fringe field.

At this time, the fringe field is generated by the electric field inducing window 25 formed inside the common electrode 24, so that the liquid crystal molecules 31 are differently aligned according to the electric field inducing window 25, thereby compensating the viewing angle.

The auxiliary electrode 13 may be formed on the same layer as the data line 12 when forming the data line 12, or may be formed on the same layer as the gate line 11 when forming the gate line 11, whereby integration is improved. However, in this case, the auxiliary electrode 13 is formed to have a predetermined interval with the gate line 11 or the data line 12 to prevent electrical shorts, thereby decreasing a portion for forming the pixel electrode 15. Also, the auxiliary electrode 13 is made of a material that does not transmit light. As the auxiliary electrode 13 is overlapped with the pixel electrode 15, the aperture ratio becomes low, whereby brightness is reduced.

In the viewing angle aspect, the liquid crystal molecules 31 are slanted in region 'A,' where an electric field is generated between the auxiliary electrode 13 and the pixel electrode 15, so that a phase difference of light increases in 'A' region, thereby increasing light leakage, and decreasing a contrast ratio.

In case of the general TN mode LCD device in which the domain is not divided, the liquid crystal molecules 31 are at an 80 degree angle to the lower and upper substrates 10 and 20. Meanwhile, in case of that the TDTN mode LCD device in which the two domains are formed, the liquid crystal molecules 31 are slanted in the periphery of the pixel region due to the auxiliary electrode 13 inducing the electric field distortion. Accordingly, the phase difference of light passing through region 'A' increases, and the light leakage is generated in region 'A', whereby the contrast ratio decreases.

For preventing the light leakage, a black matrix layer may be additionally formed in region 'A'. However, as the black matrix layer is formed, the aperture ratio decreases, thereby decreasing the brightness.

SUMMARY OF THE INVENTION

Accordingly, the present invention is directed to a liquid crystal display (LCD) device that substantially obviates one or more problems due to limitations and disadvantages of the related art.

An advantage of the present invention is to provide to an LCD device for obtaining a high aperture ratio and a wide viewing angle.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof, as well as the appended drawings.

To achieve these and other advantages and in accordance with the purpose of the invention, as embodied and broadly described herein, an LCD device includes first and second substrates; a plurality of gate and data lines on the first substrate to define a plurality of pixel regions; a pixel electrode in each pixel region; a common electrode on the second substrate, the common electrode having an electric field inducing window dividing each pixel region into at least two domains; an auxiliary electrode on the first substrate, the auxiliary electrode corresponding to the periphery of the pixel electrode in one of at least two domains; and a liquid crystal layer between the first and second substrates.

In another aspect, an LCD device includes first and second substrates; a plurality of gate and data lines on the first substrate to define a plurality of pixel regions; a pixel electrode in the pixel region, the pixel electrode having an electric field inducing window dividing each pixel into at least two domains; an auxiliary electrode below the electric field inducing window; a common electrode on the second substrate; a dielectric structure on the common electrode, the dielectric structure corresponding to the periphery of the pixel electrode in one of at least two domains; and a liquid crystal layer between the first and second substrates.

In another aspect, an LCD device includes first and second substrates; a plurality of gate and data lines on the first substrate to define a plurality of pixel regions; a pixel electrode in each pixel region; a common electrode on the second substrate, the common electrode having an electric field inducing window dividing each pixel region into at least two domains; an auxiliary electrode on the first substrate, the auxiliary electrode corresponding to the electric field inducing window; a dielectric structure on the first substrate, the dielectric structure corresponding to the periphery of the pixel electrode in one of at least two domains; and a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1A:
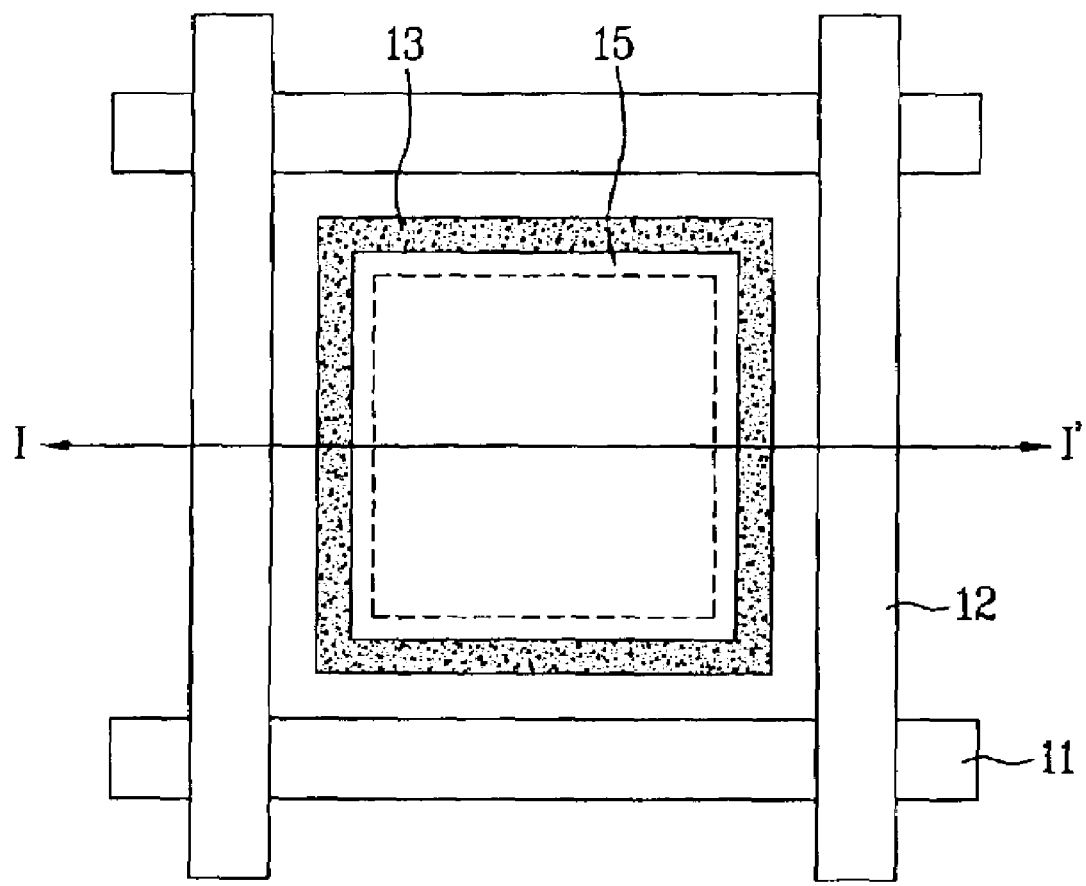
FIG. 1A is a plan view illustrating a related art liquid crystal display (LCD) device.
Figure 1B:
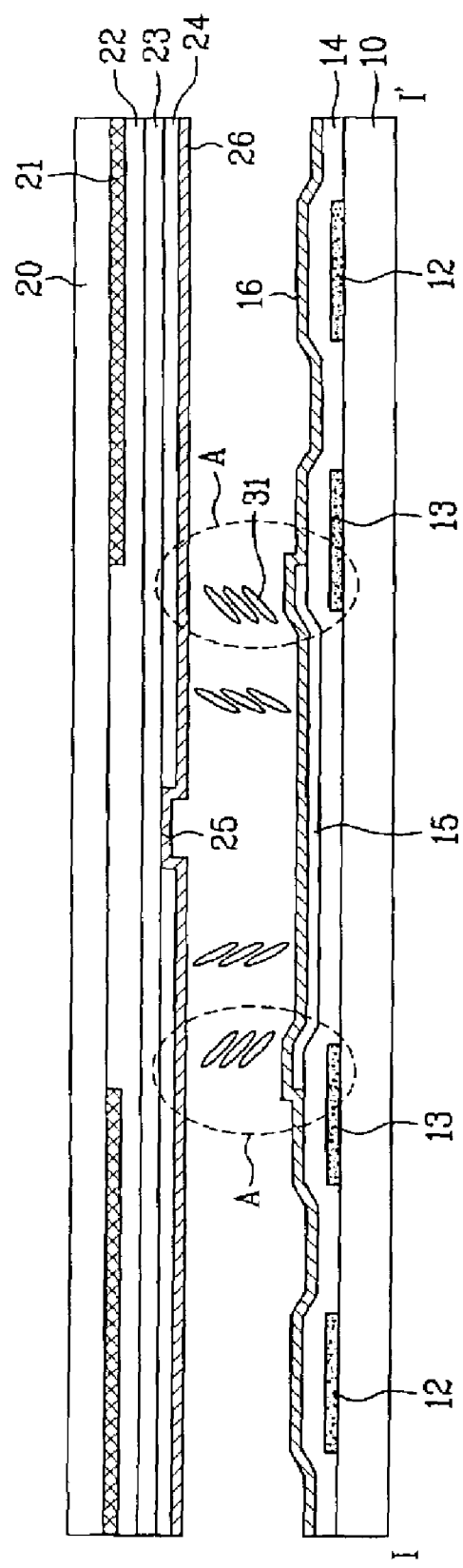
FIG. 1B is a cross-sectional view illustrating a related art LCD device taken along line I–I' of FIG. 1A when a voltage is applied.
Figure 2A:
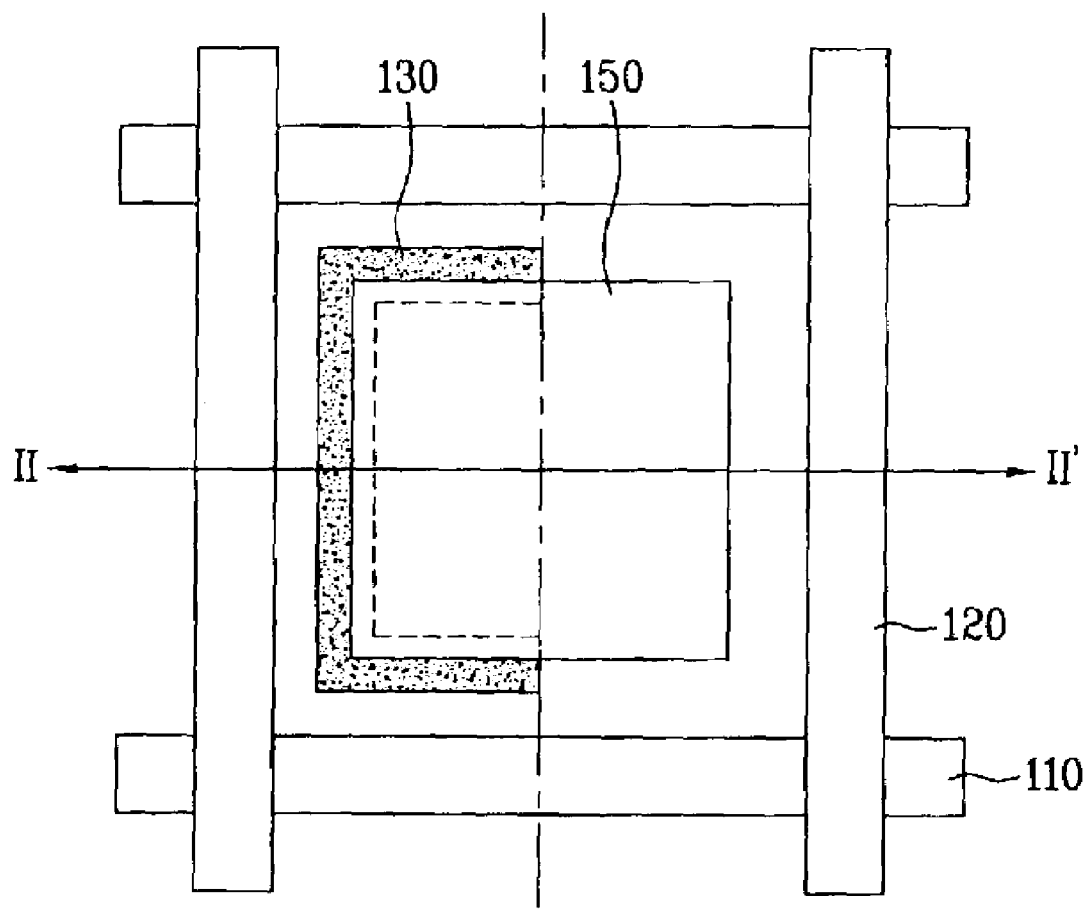
FIG. 2A is a plan view illustrating a pixel of an LCD device according to the first embodiment of the present invention.
Figure 2B:
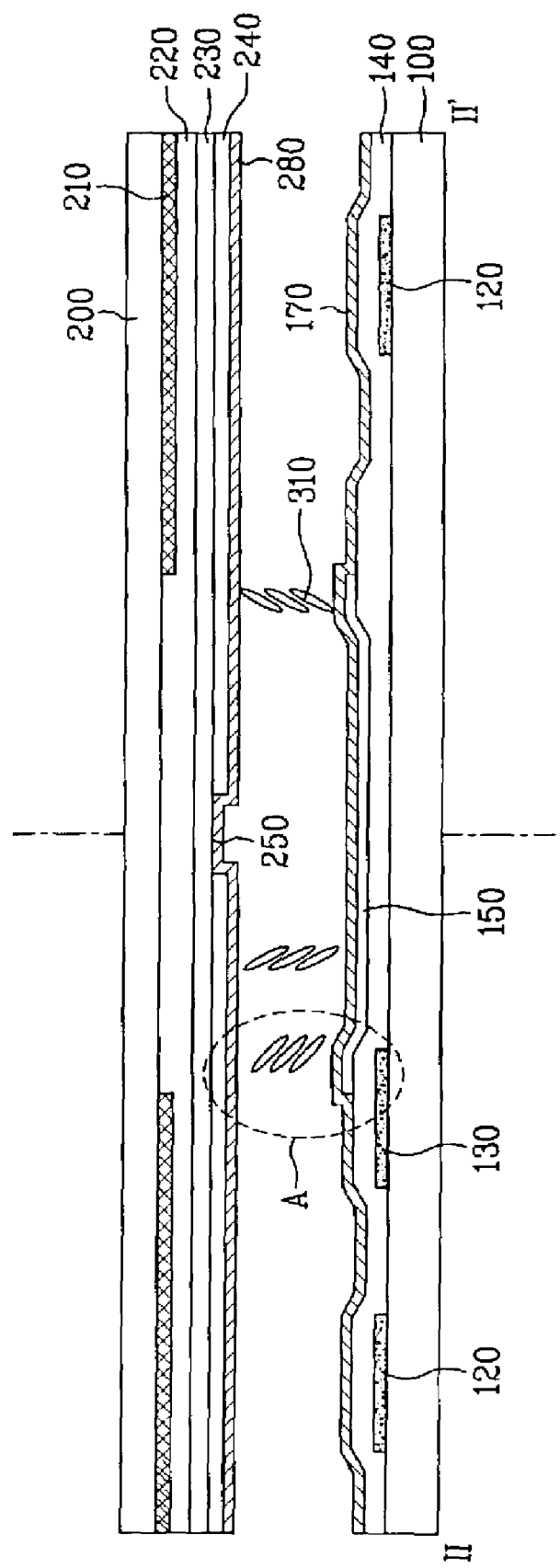
FIG. 2B is a cross-sectional view illustrating an LCD device taken along line II–II' of FIG. 2A when a voltage is applied.

FIG. 2A is a plan view illustrating a pixel of an LCD device according to the first embodiment of the present invention. FIG. 2B is a cross-sectional view illustrating an LCD device taken along line II–II' of FIG. 2A when a voltage is applied.

Referring to FIG. 2A, the LCD device according to the first embodiment of the present invention includes a plurality of gate lines 110 and data lines 120 crossing to each other for defining a plurality of pixel regions on a lower substrate 100, and a pixel electrode 150 in each pixel region. Also, an auxiliary electrode 130 is formed on the same layer as the data line 120, which is partially overlapped with the pixel electrode in the periphery of one region (domain) of the pixel region equally divided into two. That is, the auxiliary electrode is formed along the periphery of roughly half of the pixel electrode 150.

The structure of the pixel region and the lower and upper substrates will be explained in detail.

As shown in FIG. 2B, the lower substrate 100 includes a plurality of gate lines (not shown), a plurality of data lines 120, a thin film transistor (not shown), an auxiliary electrode 130, a passivation layer 140, a pixel electrode 150, and a first alignment layer 170. At this time, the plurality of gate lines (not shown) and data lines 120 cross each other, and a thin film transistor (not shown) is formed at each crossing point of the gate and data lines. The auxiliary electrode 130 is formed at a region where an alignment direction of the liquid crystal molecules is not corresponding to an alignment direction of the lower substrate 100 when applying a voltage to the same layer as the data line 120. Then, the passivation layer 140 is formed on an entire surface of the lower substrate 100 including the data line 120 and the auxiliary electrode 130. After that, the pixel electrode 150 is formed in the pixel region, and the first alignment layer 170 is formed on the entire surface of the passivation layer 140 including the pixel electrode 150 for defining the alignment direction of the lower substrate 100.

In this state, the auxiliary electrode 130 may be formed on the same layer as the gate line (not shown), or may be formed not to be overlapped with the pixel electrode 150. Also, a gate insulating layer (not shown) is formed between the gate line (not shown) and the data line 120. The gate insulating layer and the passivation layer 140 may be made of SiNx, SiOx, BenzoCycloButene (BCB), acrylic resin or polyamide compound.

Although not shown, the thin film transistor including a gate electrode, a semiconductor layer and source/drain electrodes is formed at the crossing point of the gate line (not shown) and the data line 120.

The upper substrate 200 includes a black matrix layer 210, a color filter layer 220, an overcoat layer 230, a common electrode 240, and a second alignment layer 280. The black matrix layer 210 prevents light from leaking in regions other than the pixel region, and the color filter layer 220 is formed on the black matrix layer 210 for displaying R, G and B colors. The overcoat layer 230 is formed for protecting the color filter layer 220 and planarizing the upper substrate 200. The common electrode 240 has an electric field inducing window 250 therein for dividing one pixel into at least two domains. Also, the second alignment layer 280 is formed on the entire surface of the common electrode 240 for defining an alignment direction of the upper substrate. In this state, the overcoat layer 230 may not be formed on the upper substrate 200.

The first and second alignment layers 170 and 280 may be formed of polyamide or polyimide compound material, polyvinylalcohol (PVA), or polyamic acid with rubbing. Also, the first and second alignment layers 170 and 280 may be formed of any material having photoreaction group such as polyvinylcinnamate (PVCN), polysiloxanecinnamate (PSCN) or cellulosecinnamate (CelCN) by photo-alignment method. In this state, the pretilt angle and alignment direction are simultaneously determined by photo alignment process at least one time. It may be used ultraviolet rays of any one of unpolarized light, non-polarized light, linearly polarized light or partially polarized light.

A liquid crystal layer of the liquid crystal molecules is formed between the lower and upper substrates 100 and 200. The liquid crystal molecules are Twisted Nematic (TN) types of positive dielectric anisotropy. Also, a chiral dopant may be added to the liquid crystal layer.

An operation of the LCD device having the aforementioned structure according to the present invention will be explained as follows.

When the voltage is not applied, longitudinal directions of the liquid crystal molecules are parallel with the lower and upper substrates 100 and 200, and the liquid crystal molecules are continuously twisted at a 90 degree angle. Thus, light moves along the longitudinal direction of the twisted liquid crystal molecules, whereby a screen becomes white. When the voltage is applied, as shown in FIG. 2B, the longitudinal directions of the liquid crystal molecules 310 are roughly in perpendicular to the lower and upper substrates 100 and 200, whereby a screen becomes black.

The electric field inducing window 250 divides one pixel into first and second domains so that the liquid crystal molecules are symmetrically aligned according to a boundary of the electric field inducing window 250. At this time, the auxiliary electrode 130 is formed in the first domain of which the alignment direction is different from the alignment direction of the first alignment layer 170. The alignment direction of first alignment layer 170, defining the initial alignment of the adjacent liquid crystal molecules 310, is deflected to the right side, so that the alignment direction of the first alignment layer 170 is different from the alignment direction of the liquid crystal molecules in other regions in the first domain when applying the voltage. Thus, the auxiliary electrode 130 is formed at a portion corresponding to the periphery of the pixel electrode of the first domain, so that the in-plane electric field is induced, thereby deflecting the alignment direction of the liquid crystal molecules 310 to the left side in the first domain.

Meanwhile, the alignment direction of the liquid crystal molecules is same as the alignment direction of the first alignment layer 170 in the second domain, whereby the alignment direction of the liquid crystal molecules is defined according to the first alignment layer 170 in the second domain. Thus, the auxiliary electrode 130 is not additionally required in the second domain.

At this time, the auxiliary electrode is made of a material that does not transmit light, so that the aperture ratio decreases in case of that the pixel electrode is overlapped with the auxiliary electrode. In the pixel region having the two domains according to the present invention, the auxiliary electrode is not required in one domain (second domain). That is, it is possible to prevent the aperture ratio from decreasing in one domain since the auxiliary electrode is not formed in one domain (second domain). Also, the auxiliary electrode is not formed in one domain, thereby increasing the portion for forming the pixel electrode. Furthermore, since the auxiliary electrode is formed in one domain (first domain), a region A where the liquid crystal molecules are severely slanted is removed in one domain when the voltage is applied, thereby decreasing light leakage by about half.

Although not shown, in the LCD device according to the first embodiment of the present invention, it is possible to form the electric field inducing window 250 in the pixel electrode 150, and the auxiliary electrode 130 in the second domain where the alignment direction of the liquid crystal molecules is different from the alignment direction of the first alignment layer.

Figure 3A:
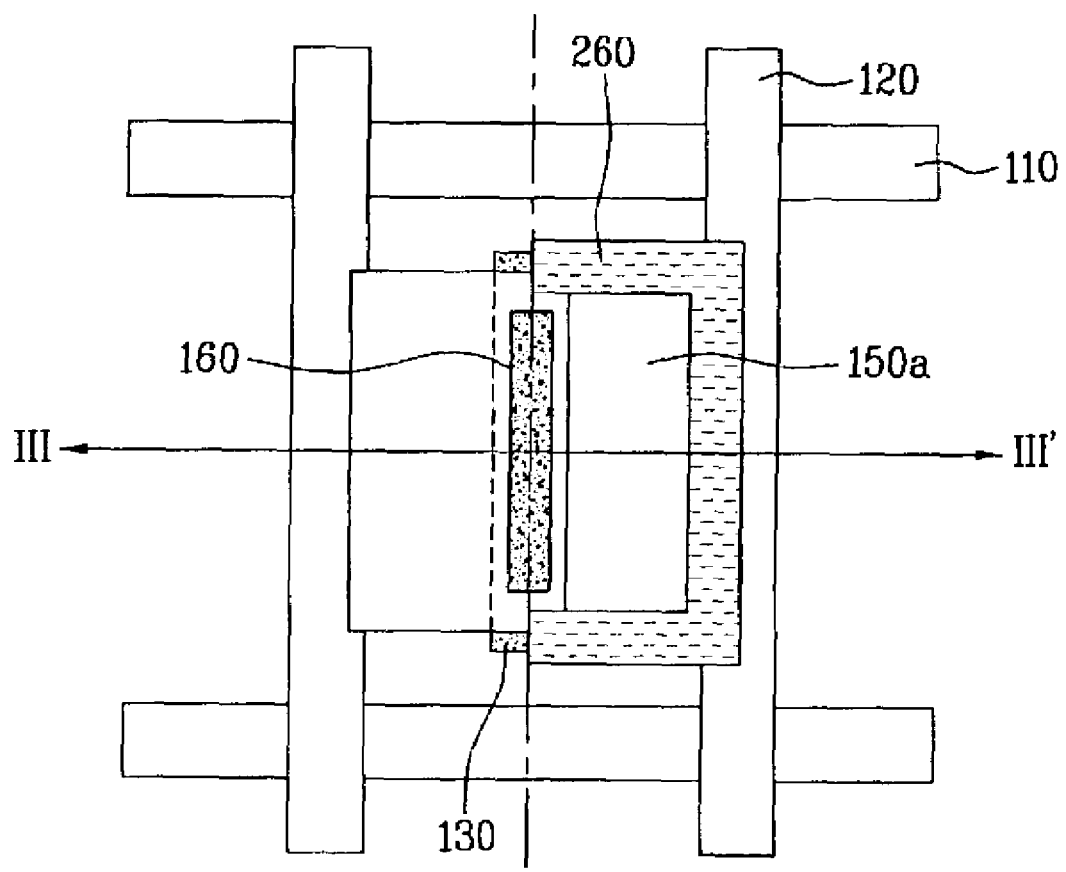
FIG. 3A is a plan view illustrating a pixel of an LCD device according to the second embodiment of the present invention.
Figure 3B:
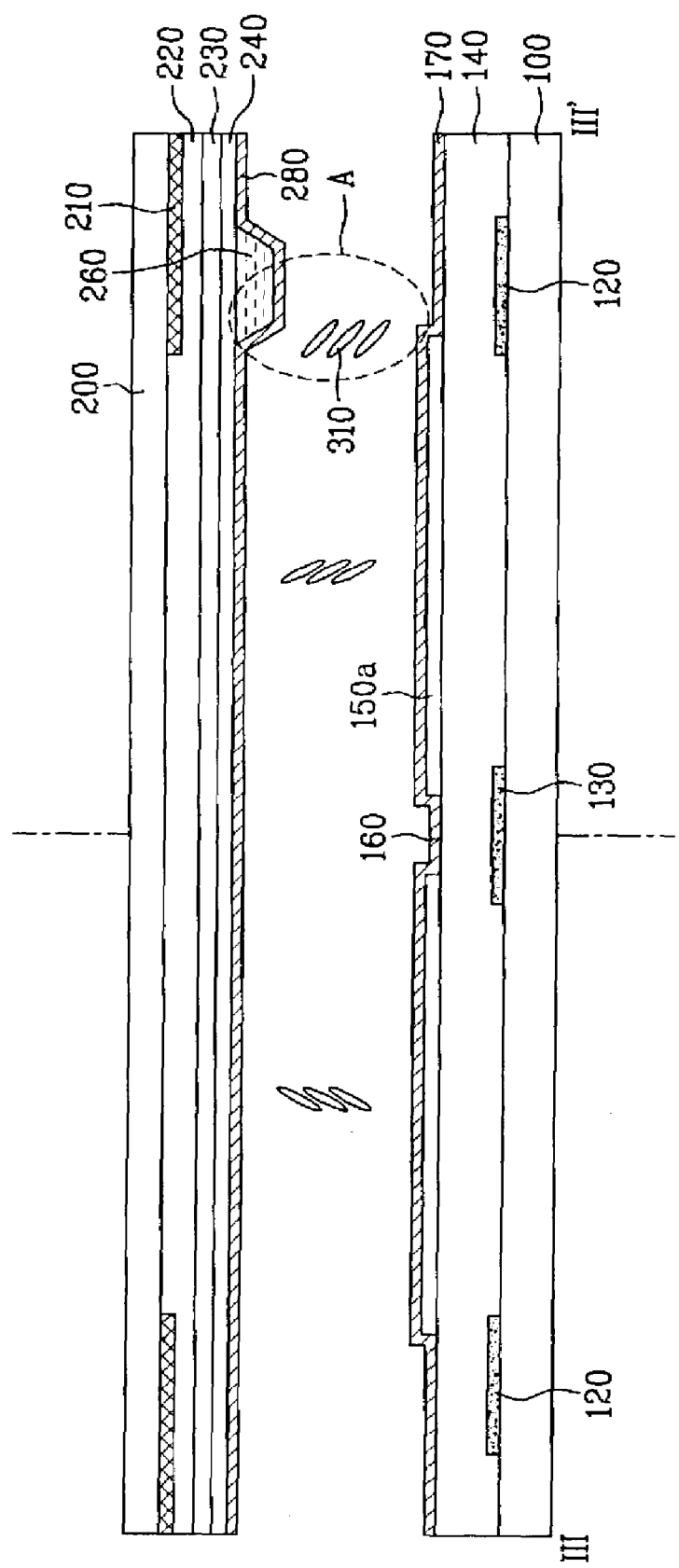
FIG. 3B is a cross-sectional view illustrating an LCD device taken along line III–III' of FIG. 3A when a voltage is applied.

FIG. 3A is a plan view illustrating a pixel of an LCD device according to the second embodiment of the present invention, and FIG. 3B is a cross-sectional view illustrating an LCD device taken along line III–III' of FIG. 3A when a voltage is applied.

In the LCD device according to the first embodiment of the present invention, the electric field is distorted to the outside direction of the pixel when dividing the domains of the pixel. Referring to FIG. 3A and FIG. 3B, the LCD device according to the second embodiment of the present invention is different from the LCD device according to the first embodiment of the present invention in that the electric field is distorted to the center direction of the pixel. For this, an electric field inducing window 160 is formed in a pixel electrode 150a, and an auxiliary electrode 130 is formed below the pixel electrode 150a to correspond to the electric field inducing window 160. A dielectric structure 260 is formed on a common electrode 240 corresponding to the periphery of one domain where the alignment direction of the liquid crystal molecules is different from the alignment direction of the first alignment layer. Except the aforementioned constituent elements, others are same as those of the first embodiment of the present invention, whereby the same reference numbers will be used throughout the drawings to refer to the same or like parts.

In the LCD device according to the second embodiment of the present invention, a lower substrate 100 includes a plurality of gate lines 110 and data lines 120 crossing each other to define a plurality of pixel regions, and a pixel electrode 150a in each pixel region. An electric field inducing window 160 is formed at the center of the pixel electrode 150a for dividing alignment direction of liquid crystal molecules when applying a voltage, and an auxiliary electrode 130 is formed below the electric field inducing window 160. Then, a dielectric structure 260 is formed on a common electrode (not shown) corresponding to the periphery of one domain (or to the periphery of the pixel electrode 150a in one domain) where the alignment direction of the liquid crystal molecules is different from the alignment direction of the lower substrate when the voltage is applied.

Referring to FIG. 3B, the lower substrate includes the plurality of gate lines (not shown) and data lines 120 cross each other to define the plurality of pixel regions, a thin film transistor (not shown) at each crossing point of the plurality of gate and data lines, the auxiliary electrode at the center portion of each pixel region on the same layer as the data line 120, a passivation layer 140 on an entire surface of the lower substrate 100 including the data line 120 and the auxiliary electrode 130, the pixel electrode 150a having the electric field inducing window 160 at a portion corresponding to the auxiliary electrode 130 in the pixel region, and a first alignment layer 170 on the entire surface of the passivation layer 140 including the pixel electrode 150a for defining the alignment direction of the lower substrate 100.

At this time, the auxiliary electrode 130 may be formed on the same layer as the gate line (not shown), or may be formed not to be overlapped with the pixel electrode 150a. Also, a gate insulating layer (not shown) is formed between the gate line (not shown) and the data line 120. The gate insulating layer and the passivation layer 140 may be made of SiNx, SiOx, BenzoCycloButene (BCB), acrylic resin, or polyamide compound.

Although not shown, the thin film transistor including a gate electrode, a semiconductor layer, and source/drain electrodes is formed at each crossing point of the gate lines (not shown) and the data lines 120.

An upper substrate 200 includes a black matrix layer 210 preventing light from leaking in regions except the pixel region, a color filter layer 220 on the black matrix layer 210 for displaying R, G and B colors, an overcoat layer 230 protecting the color filter layer 220 and planarizing the upper substrate 200, the common electrode 240 on an entire surface of the overcoat layer 230, the dielectric structure 260 on the common electrode (not shown) corresponding to the periphery of the domain where the alignment direction of the liquid crystal molecules is different from the alignment direction of the lower substrate, and a second alignment layer 280 on the common electrode 240 including the dielectric structure for defining the alignment direction of the upper substrate 200. At this time, the overcoat layer 230 may not be formed on the upper substrate 200.

Preferably, the dielectric structure 260 has a dielectric constant same as that of the liquid crystal, or less. Also, the dielectric structure 260 may be formed of photosensitive material. For example, the dielectric structure 260 may be formed of photoacrylate or BenzoCycloButene (BCB).

The first and second alignment layers 170 and 280 may be formed of polyamide or polyimide compound material, polyvinylalcohol (PVA) or polyamic acid with rubbing. Also, the first and second alignment layers 170 and 280 may be made of a material having photoreaction group such as polyvinylcinnamate (PVCN), polysiloxanecinnamate (PSCN) or cellulosecinnamate (CelCN) compound by photo-alignment method. In this state, the pretilt angle and alignment direction are simultaneously determined by photo alignment process step at least one time. It may be used ultraviolet rays of any one of unpolarized light, non-polarized light, linearly polarized light or partially polarized light.

A liquid crystal layer of the liquid crystal molecules 310 is formed between the lower and upper substrates 100 and 200. The liquid crystal molecules 310 are Twisted Nematic (TN) types of positive dielectric anisotropy. Also, a chiral dopant may be added to the liquid crystal layer.

An operation of the LCD device having the aforementioned structure according to the present invention will be explained as follows.

When the voltage is not applied, longitudinal directions of the liquid crystal molecules 310 are parallel with the lower and upper substrates 100 and 200, and the liquid crystal molecules are continuously twisted at a 90 degree angle. Thus, light moves along the longitudinal direction of the twisted liquid crystal molecules, whereby a screen becomes white. When the voltage is applied, as shown in FIG. 3B, the longitudinal directions of the liquid crystal molecules 310 are roughly perpendicular to the lower and upper substrates 100 and 200, whereby a screen becomes black.

The electric field inducing window 160 of the lower substrate 100 divides one pixel into first and second domains so that the liquid crystal molecules are symmetrically aligned in the first and second domains according to the electric field inducing window 160. In this state, the dielectric structure 260 is formed on the common electrode 240 of the upper substrate 200 corresponding to the periphery of the pixel electrode 150a of the lower substrate 100 in the second domain where the alignment direction of the liquid crystal molecules is different from the alignment direction of the first alignment layer 170 on the lower substrate 100.

The alignment direction of first alignment layer 170, defining the initial alignment state of the adjacent liquid crystal molecules 310, is deflected to the right side, whereby the alignment direction of the first alignment layer 170 is different from the alignment direction of the liquid crystal molecules in the second domain when the voltage is applied. Thus, the dielectric structure 260 is formed at a portion of the upper substrate corresponding to the periphery of the pixel electrode of the lower substrate in the second domain, so that the in-plane electric field is induced, thereby deflecting the alignment direction of the liquid crystal molecules 310 to the left side in the second domain.

In the first domain, the alignment direction of the liquid crystal molecules is defined by the alignment direction of the first alignment layer 170, since the alignment direction of the liquid crystal molecules is same as the alignment direction of the first alignment layer 170 in the first domain, so that a structure for distorting the electric field is not additionally formed in the first domain.

Accordingly, in the pixel having the two domains according to the second embodiment of the present invention, the structure for distorting the electric field is not required in one domain. The auxiliary electrode or the dielectric structure are made of a material that does not transmit light, so that aperture ratio decreases in case of that the pixel electrode is overlapped with the dielectric structure or the auxiliary electrode. That is, in the present invention, it is possible to prevent aperture ratio from decreasing since the auxiliary electrode or the dielectric structure is not formed in one of the two domains.

In the related art LCD device, a predetermined interval is required due to the pixel electrode and the auxiliary electrode being adjacent to the pixel electrode. However, in the LCD device according to the present invention, the predetermined interval between the pixel electrode and the auxiliary electrode is not required, thereby increasing the portion for forming the pixel electrode.

Furthermore, since the auxiliary electrode is formed in one domain, a region A where the liquid crystal molecules are severely slanted is removed in one domain when the voltage is applied, thereby decreasing light leakage in half.

When respectively depositing the first and second alignment layers on the entire surfaces of the lower and upper substrates in the LCD device according to the present invention, the protruding dielectric structure is not formed in one domain, thereby improving alignment-treatment efficiency as compared with the related art.

In the LCD device according to the second embodiment of the present invention shown in FIG. 3A, the electric field inducing window and the dielectric structure may be differently formed.

Figure 4:
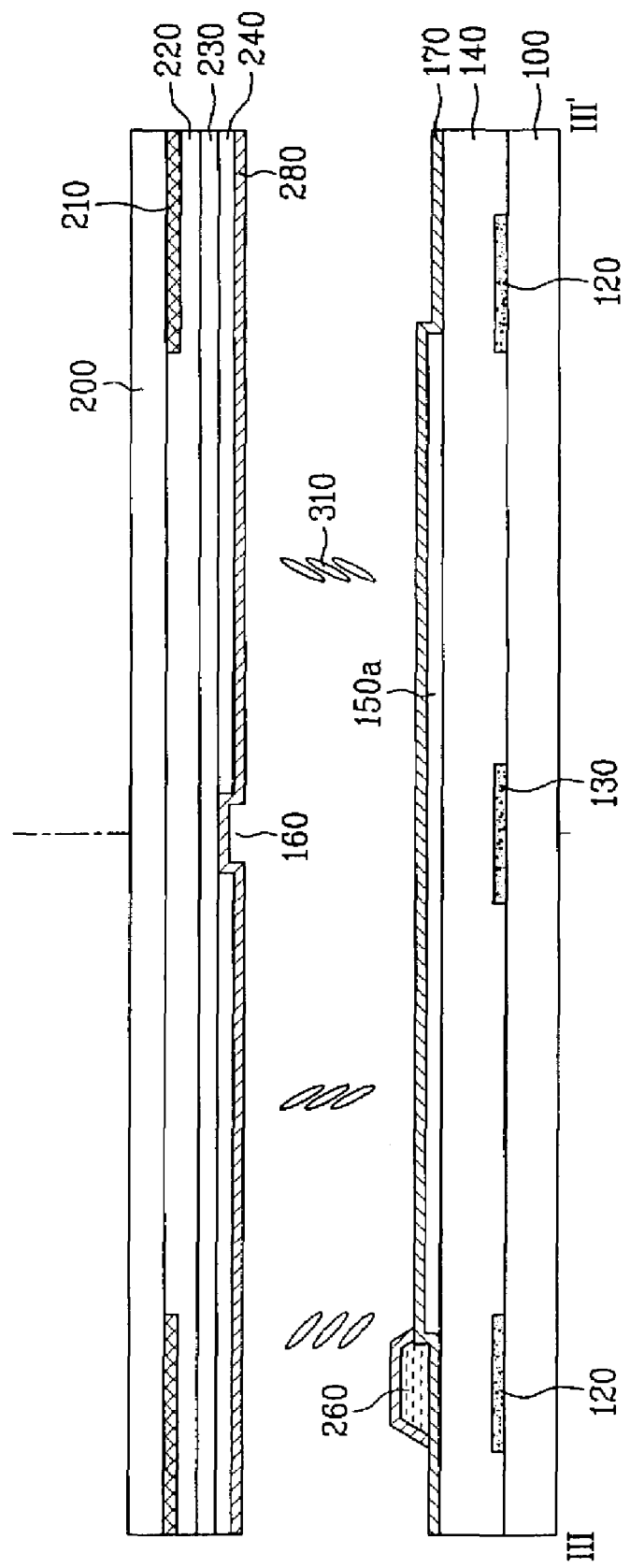
FIG. 4 is a cross-sectional view illustrating an LCD device taken along line III–III' of FIG. 3A according to the third embodiment of the present invention.

FIG. 4 is a cross-sectional view illustrating an LCD device taken along line III–III' of FIG. 3A according to the third embodiment of the present invention.

Referring to FIG. 4, the LCD device according to the third embodiment of the present invention is different from the LCD device according to the second embodiment of the present invention in that the electric field inducing window 160 is formed in the common electrode 240, the auxiliary electrode 130 is formed below the electrode 150a to correspond to the electric field inducing window 160, and the dielectric structure 260 is formed at a portion of the lower substrate 100 corresponding to the periphery of one domain (or to the periphery of the pixel electrode 150a in one domain) where the alignment direction of the liquid crystal molecules is different from the alignment direction of the first alignment layer. Except the aforementioned constituent elements, others are same as those of the LCD device according to the second embodiment of the present invention, whereby the same reference numbers will be used throughout the drawings to refer to the same or like parts.

In the LCD device according to the third embodiment of the present invention, a lower substrate 100 includes a plurality of gate lines 110 and data lines 120 crossing each other to define a plurality of pixel regions, and a pixel electrode 150a in each pixel region. A common electrode 240 is formed on an upper substrate 200.

As shown in FIG. 4, an electric field inducing window 160 is formed at the center of the pixel region for dividing the pixel into two domains, so that liquid crystal molecules are differently aligned in the two domains when the voltage is applied. The auxiliary electrode 130 is formed on the lower substrate 100 below the electric field inducing window 160, and the dielectric structure 260 is formed at a portion of the lower substrate 100 corresponding the periphery of one domain where the alignment direction of the liquid crystal molecules is different from the alignment direction of the lower substrate. At this time, the dielectric structure 260 may be formed on the common electrode 240 of the upper substrate in one domain where the alignment direction of the liquid crystal molecules is different from the alignment direction of the lower substrate.

In the LCD device according to the illustrated embodiments of the present invention, one pixel is divided into two domains. However, it is possible to divide one pixel into three domains or more in the LCD device according to the present invention.

As mentioned above, the LCD device according to the present invention has the following advantages.

First, the structure for distorting the electric field is formed for differentiating the alignment direction of the liquid crystal molecules in domains. The structure for distorting the electric field is not formed at the portion where the alignment direction of the liquid crystal molecules is same as the alignment direction of the respective substrates. Thus, as the number of the structure for distorting the electric field decreases, the aperture ratio becomes high.

Also, the structure for dividing the alignment direction of the liquid crystal molecules generates the light leakage since the liquid crystal molecules are slanted when applying the voltage. In the LCD device according to the present invention, the structure for dividing the alignment direction of the liquid crystal molecules is not formed in one domain, whereby the light leakage decreases in half.

In case of forming the alignment layer on the protruding dielectric structure, alignment efficiency decreases at the portion of the alignment layer having the protruding dielectric structure. However, in the LCD device according to the present invention, the protruding dielectric structure is removed in the domain where the alignment direction of the liquid crystal molecules is same as the alignment direction of the lower substrate, whereby the alignment efficiency increases. Also, if the number of the protruding dielectric structures increases, electric charges may be easily accumulated on the protruding dielectric structures, thereby generating an afterimage. In the LCD device according to the present invention, the afterimage is overcome since the protruding dielectric structures are removed in the domain where the alignment direction of the liquid crystal molecules is same as the alignment direction of the lower substrate.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device comprising:
   first and second substrates;
   a plurality of gate and data lines on the first substrate to define a plurality of pixel regions;
   a pixel electrode in each pixel region;

a common electrode on the second substrate, the common electrode having an electric field inducing window dividing each pixel region into at least two domains;

an auxiliary electrode on the first substrate, the auxiliary electrode corresponding to the periphery of the pixel electrode in only one of the at least two domains;

a liquid crystal layer between the first and second substrates;

a thin film transistor at each crossing point of the gate and data lines;

a black matrix layer on the second substrate;

a color filter layer on the black matrix layer; and first and second alignment layers on the first and second substrates, wherein the auxiliary electrode is formed at a portion where an alignment direction of liquid crystal molecules is opposite to an alignment direction of the first alignment layer when a voltage is applied.

2. The LCD device of claim 1, wherein the auxiliary electrode is formed on the same layer as the gate line.

3. The LCD device of claim 1, wherein the auxiliary electrode is formed on the same layer as the data line.

4. The LCD device of claim 1, wherein the auxiliary electrode is formed in a rectangular 'C' shape.

* * * * *